(12) United States Patent
Rosete et al.

(10) Patent No.: US 6,385,365 B1
(45) Date of Patent: May 7, 2002

(54) FIBER OPTIC SWITCHING APPARATUS

(75) Inventors: Ricardo Antonio Rosete, Oxnard, CA (US); Kuang-Yu Hsu, Hualien; Hung-Ching Hou, Kaohsiung, both of (TW); Huai-Ming Tu, Tucheng (TW)

(73) Assignee: Chynoptics Technologies, Inc., Hsinchu (TW)

( * ) Notice: Subject to any disclaimer, the term of this patent is extended or adjusted under 35 U.S.C. 154(b) by 37 days.

(21) Appl. No.: 09/688,631

(22) Filed: Oct. 16, 2000

(51) Int. Cl.[7] .................................................. G02B 6/26
(52) U.S. Cl. .............................. 385/23; 385/16; 385/22
(58) Field of Search ............................ 385/16, 17, 18, 385/19, 20, 21, 22, 23

(56) References Cited

U.S. PATENT DOCUMENTS

| | | | | |
|---|---|---|---|---|
| 4,189,206 A | * | 2/1980 | Terai et al. | 250/229 |
| 4,759,597 A | * | 7/1988 | Lemonde | 385/22 |
| 4,896,935 A | * | 1/1990 | Lee | 385/22 |
| 5,035,482 A | * | 7/1991 | ten Berge et al. | 385/16 |
| 5,098,207 A | * | 3/1992 | Blomgren | 385/16 |
| 5,757,991 A | * | 5/1998 | Harman | 385/15 |
| 6,044,186 A | * | 3/2000 | Chang et al. | 385/16 |

* cited by examiner

*Primary Examiner*—Tulsidas Patel
(74) *Attorney, Agent, or Firm*—Thomas, Kayden, Horstemeyer & Risley (57) ABSTRACT

A fiber optic switching apparatus comprises a fiber alignment head with a groove formed therein to mount with a first optical fiber, a switching member adjacent to the fiber alignment head and pivotable between a first position and a second position, and a second optical fiber adjacent to the switching member. The ends of the first and second optical fibers are in alignment when the switching member is in its first position and out of alignment when the switching member is in its second position. The improvement is that the fiber optic switching apparatus further comprises a supporter that is detached from the switching member to connect with the second optical fiber so that the end of the second optical fiber will not fluctuate in connection with the switching member when the first and second optical fibers are placed in alignment within the groove.

20 Claims, 10 Drawing Sheets

FIBER OPTIC SWITCHING APPARATUS

FIELD OF THE INVENTION

The invention relates to the field of optical communications systems, and particularly to optical fiber switching by means of a device arranged for precise alignment of one optical fiber into another optical fiber and preferably operated by electro-magnetic means.

BACKGROUND OF THE INVENTION

Fiber optics telecommunications lines are being installed world wide to provide higher bandwidth and greater reliability than copper wire lines, microwave relay stations or satellites. A fiber optic communications system includes switching stations so that communications signals may be routed between any two locations in the network. Each switching station switches signals carried by one optical fiber to a selected one of a plurality of optical fibers for transmission to another switching station in the network. Systems for switching optical signals between optical fibers include an apparatus to place the fibers end-to-end so that light may be coupled out of one fiber into another. One drawback with fiber optic communications systems is that the switches used to make and break connections are expensive and unreliable.

The switching station should be highly reliable and have low insertion loss and low back reflections. Insertion loss reduces signal strength whereas reflected signals cause cross talk. The fiber ends must be axially and laterally aligned and must be spaced apart by only a very small distance to meet the operational requirements.

Some designs use elaborate structures to solve alignment problems. In U.S. Pat. No. 4,189,206, for example an optical fiber is guided into a slit formed between two contact poles and through a guide hole formed by two bars transversely attached to one end of the contact poles. Another prior art switching apparatus in U.S. Pat. No. 6,044,186 issued to Chang et al. connects a first optical fiber with a switching member that is arranged to be pivoted between a first position and a second position. The ends of the first and second optical fibers are placed to be in alignment when the switching member is in its first position and out of position when the switching member is in its second position. The drawback of the learned art is that the first optical fiber is connected with the switching member so that alignment between the first and second fibers is very likely influenced by the first optical fiber and the switching member due to the connection of the first optical fiber and the switching member and the mechanic error associated with the switching member. Thus the ideal use of repeatability can hardly be obtained.

The present invention provides a better solution to the problems described above and is liable to overcome the disadvantages of the learned art.

SUMMARY OF THE INVENTION

The present invention overcomes the problems associated with the prior art described above by providing a highly reliable fiber optic switching apparatus that requires no lenses or stepping motors. It is also provided a fiber optic switching apparatus with high switching speed, low power consumption, small size and a wide operating temperature range. According to the present invention, the optical fibers in a fiber optic switching apparatus will not vibrate with the switching member when they are in alignment. The present invention further covers an anti-reflection coating (ARC) on the end surface of the optical fibers in the fiber optic switching apparatus to avoid Fabry-Perot effect, thereby rendering the insertion loss spectrum between the optical fibers flattened and the insertion loss and reflection of the optical coupling between the optical fibers reduced.

According to the present invention, a fiber optic switching apparatus comprises a fiber alignment head having a groove formed therein to mount with a first optical fiber and a second optical fiber that is arranged with its end adjacent to a switching member pivotable between a first position and a second position. The ends of the first and second optical fibers are in alignment in the groove of the fiber alignment head when the switching member is in its first position. When the switching member is in its second position, it pushes the second optical fiber upward so that the ends of the first and second optical fibers are out of alignment. The improvement is that the second optical fiber is secured in the fiber optic switching apparatus with a means that is detached from the switching member. As a result, the end of the second optical fiber does not vibrate with the switching member when the optical fibers are placed end-to-end in alignment in the groove of the fiber alignment head.

The second optical fiber, the means for supporting the second optical fiber and the groove are preferably arranged such that when the switching member is in its first position, the end of the second optical fiber is bent so that elastic forces retain it in alignment with the end of the first optical fiber in the groove.

It preferably comprises an electromechanical relay that comprises a housing apparatus for pivotally mounting the switching member in the housing and an apparatus arranged to latch the switching member such that the first and second optical fiber ends are selectively either in or out of alignment.

The ends of the first and second optical fiber are preferably formed with a cleaved surface at an angle and an anti-reflection coating (ARC) is covered onto the cleaved surface.

According to the present invention, a fiber optic switching apparatus further comprises a second fiber alignment head with a second groove formed therein for mounting a third optical fiber. The two grooves of the first and second fiber alignment heads are mounted in facing relationship so that the end of the second optical fiber is in alignment with the end of the third optical fiber in the second groove when the switching member is in its second position.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION

This disclosure describes an improved fiber optic switching or coupling apparatus for applications such as communications systems. Specific details are disclosed to provide a thorough description of the invention. However, it will be apparent that the present invention may be practical without these specific details. Well-known components of the fiber optic switching apparatus according to the present invention are shown in simplified form, rather than in details, to avoid unnecessarily obscuring the invention.

Figure 1:
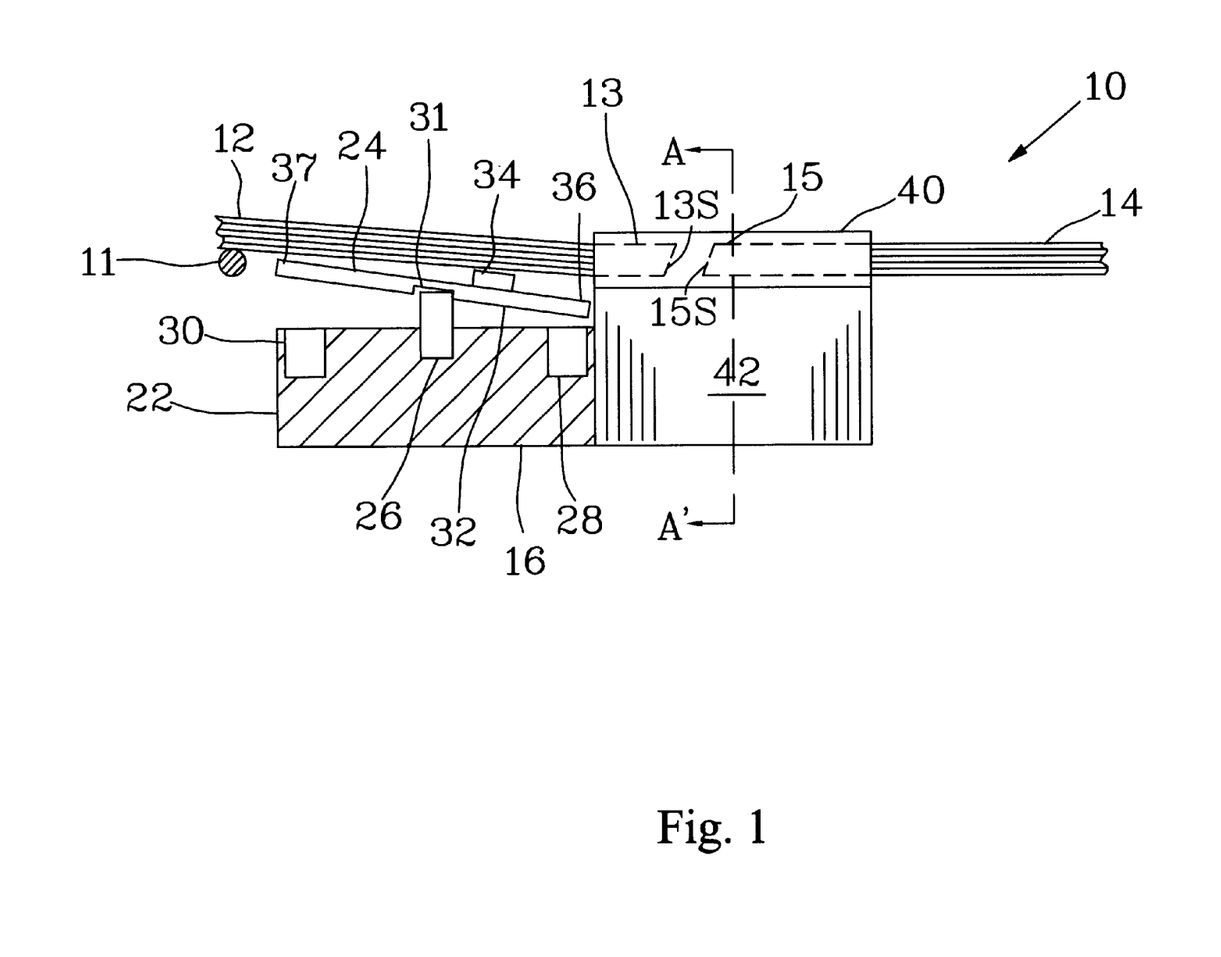
FIG. 1 is a side elevation view of a 1×1 fiber optic switching apparatus to show an input fiber arranged to provide optical signals to an output fiber.

FIG. 1 illustrates a side elevation view of an embodiment according to the present invention, in which 10 is a 1×1 fiber optic switching apparatus with an on state and an off state. When the fiber optic switching apparatus 10 is in the on state, an end 13 of an input fiber 12 and an end 15 of an output fiber 14 are aligned so that optical signals emitted from the fiber 12 are directed to the fiber 14. In the off state, the end 13 of the fiber 12 and the end 15 of the fiber 14 are not in alignment so that optical signals emitted from the fiber 12 are not directed to the fiber 14.

The position of the fiber 12 is controlled by a relay 16. It should be noted that the relay 16 is included in a presently preferred embodiment of the invention to control the position of the fiber 12. The present invention is not limited to the use of the relay 16. The invention may be practiced with other apparatus to control the position of the end 13 of the fiber 12. The relay 16 includes a housing 22 that is formed generally as a hollow box and a switching member 24 formed generally as a thin elongate rectangle made of a ferromagnetic material. The central portion of the switching member 24 is mounted on a pivoting device 26 for pivoting movement between a pair of electromagnets 28 and 30. The pivoting device 26 is preferably a generally rectangular permanent magnet that extends into a similarly shaped recess 31 in the center of a surface 32 of the switching member 24. The typical structure of the relay 16 includes a thin rectangular protruded block 34 that extends a small distance above the plane of the switching member 24.

To support the fiber 12 in the fiber optic switching apparatus 10 but detach it from the switching member 24, the fiber 12 is secured with a supporter detached from the switching member 24 and arranged such that its end 13 is adjacent to the switching member 24. For instance, the fiber 12 is mounted on a cylinder 11 as shown in the figure, in which the cylinder 11 is detached from the switching member 24 and secured preferably to the housing (not shown in the figure) of the fiber optic switching apparatus 10. However, any other stable structure not directly attached to the switching member 24 can be used to connect with the fiber 12 to support it in the fiber optic switching apparatus 10.

Figure 2:
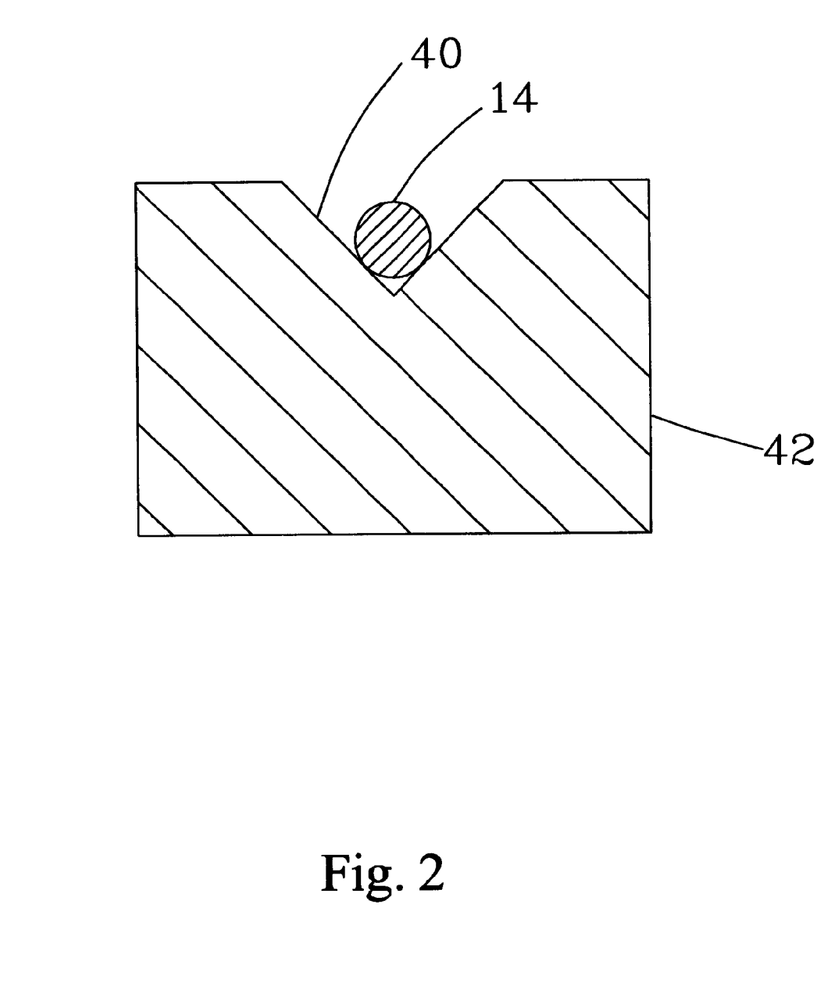
FIG. 2 is a cross sectional view of the fiber optic switching apparatus taken along line A–A' of FIG. 1.

Application of an electrical signal to the electromagnet 28 attracts the end 36 of the switching member 24 to place the switching member 24 and the input fiber 12 in the down position shown in FIG. 1. The relay 16 is adjacent to a fiber alignment head 42 that is mounted with a fiber 14 preferably in a V-groove 40 formed lengthwise in the fiber alignment head 42. As shown in FIG. 2 taken along line A–A' of FIG. 1, a portion of the fiber 14 extends into the V-groove 40 and is secured in the V-groove with a suitable adhesive as is well-known in optical fiber technology.

The fiber 12 is mounted on the cylinder 11 such that its end 13 extends into the V-groove 40 and is adjacent to the fiber 14 and in alignment with the end 15 of the fiber 14 to couple optical signals from the end 13 into the end 15 when it is in the down position of FIG. 1. The ends 13 and 15 of the fibers 12 and 14 are preferably cleaved at an angle with cleaved surfaces 13S and 15S in a range of 6° to 10° after lapped and polished. It is further preferable to cover an anti-reflection coating onto one or both of the surfaces 13S and 15S so that Fabry-Perot effect will not occur between the surfaces 13S and 15S, back reflections can be reduced to more than 60 dB, and lenses between the ends 13 and 15 are unnecessary so as to avoid the insertion loss caused by the reflections of the interfaces. The insertion loss is theoretically reduced to be 0.35 dB when there is anti-reflection coating on both surfaces 13S and 15S.

A noteworthy feature of the fiber optic switching apparatus 10 is that when it is in the on state, i.e., the end 36 of the switching member 24 is attracted by the electromagnet 28 and the end 13 of the fiber 12 is in its down position to align with the end 15 of the fiber 14 in the V-groove 40, as shown in FIG. 1, the fluctuation caused by the mechanic error of the switching member 24 will not affect the end 13 of the fiber 12 to change the alignment since the fiber 12 is mounted on the cylinder 11 but not connected with the switching member 24. Therefore, the stability and reliability of the fiber optic switching apparatus 10 is enhanced.

Figure 3:
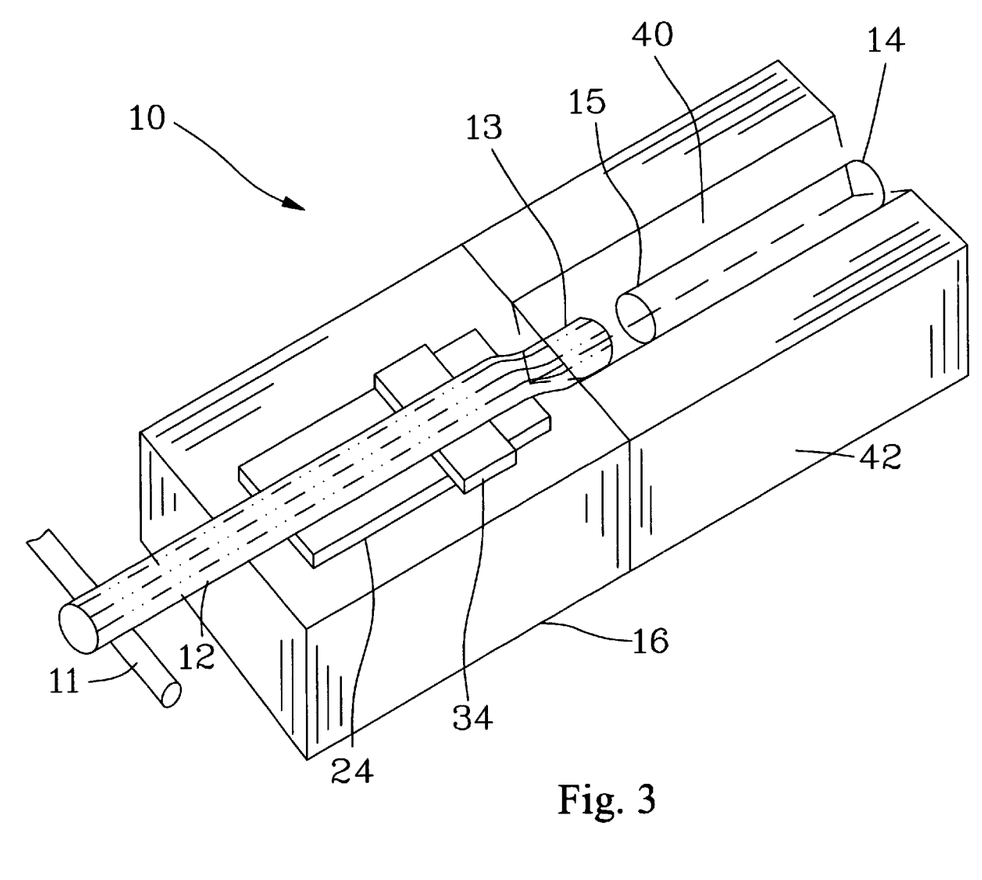
FIG. 3 is a perspective view of the fiber optic switching apparatus of FIG. 1.
Figure 4:
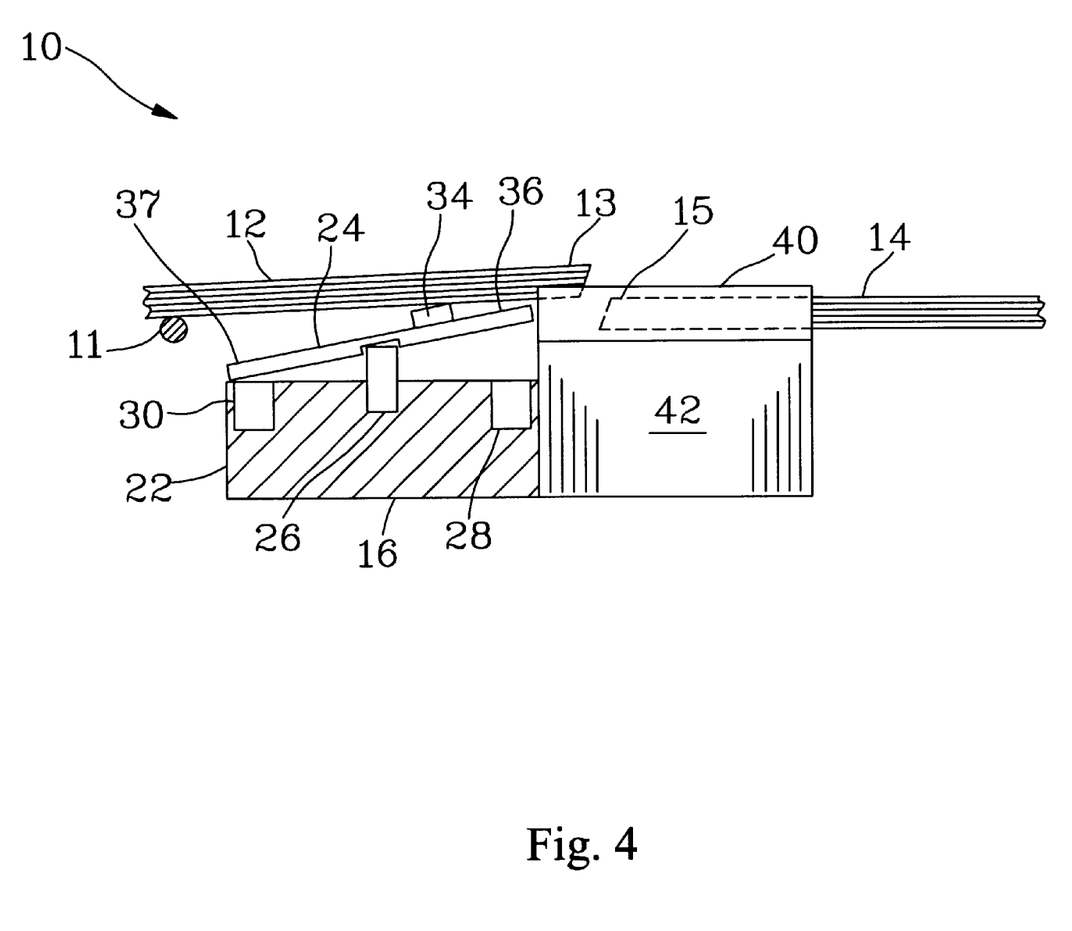
FIG. 4 is a side elevation view of the fiber optic switching apparatus of FIG. 1 to show the input and output fibers in the off state.

FIG. 3 is a perspective view of the fiber optic switching apparatus 10. As mentioned before, when the end 36 of the switching member 24 is attracted by the electromagnet 28, the fiber 12 is placed to the down position and the end 13 of it extends into the V-groove 40 so as to align the end 13 with the end 15 in the V-groove 40, in which the cylinder 10, fiber 12 and the V-groove 40 are preferably arranged such that the end 13 of the input fiber 12 is bent so that it is pressed in the V-groove 40 due to a downward force resulted from elastic forces applied to it. On the contrary, application of an electrical signal to the electromagnet 30 attracts the end 37 of the switching member 24 to force the end 13 of the fiber 12 to move away from its on state position mentioned before by the upward movement of the protruded block 34. As shown in FIG. 4, the end 36 of the switching member 24 and the end 13 of the fiber 12 in this case are in their up state position so that the ends 13 and 15 are out of alignment.

Figure 5:
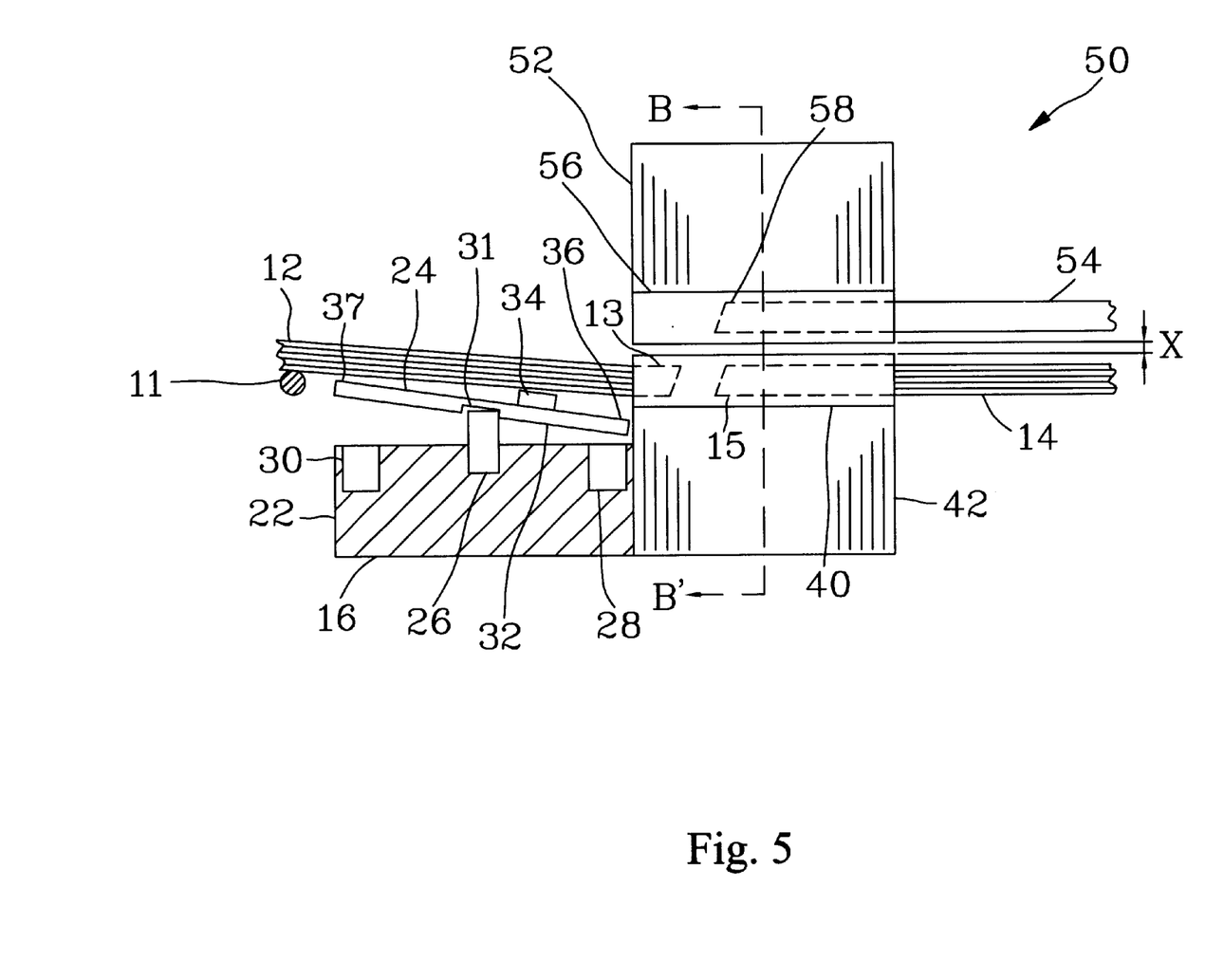
FIG. 5 is a side elevation view of a 1×2 fiber optic switching apparatus to show an input fiber arranged to provide optical signals to a first output fiber.
Figure 6:
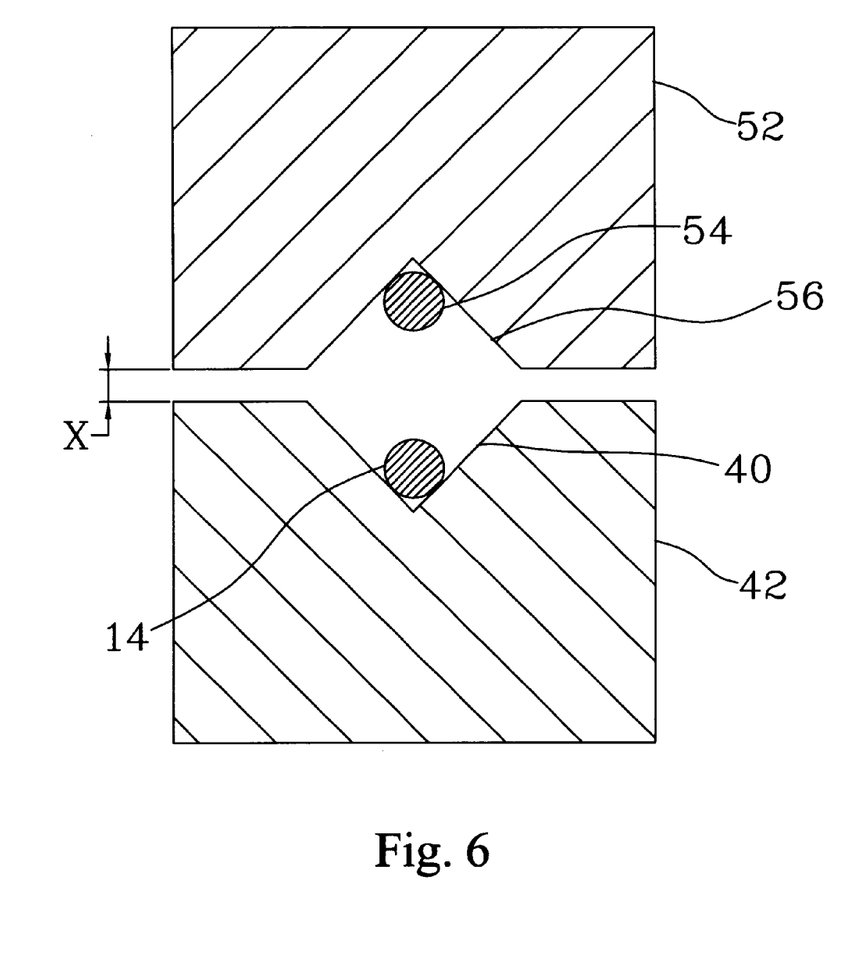
FIG. 6 is a cross sectional view of the fiber optic switching apparatus taken along line B–B' of FIG. 5.
Figure 7:
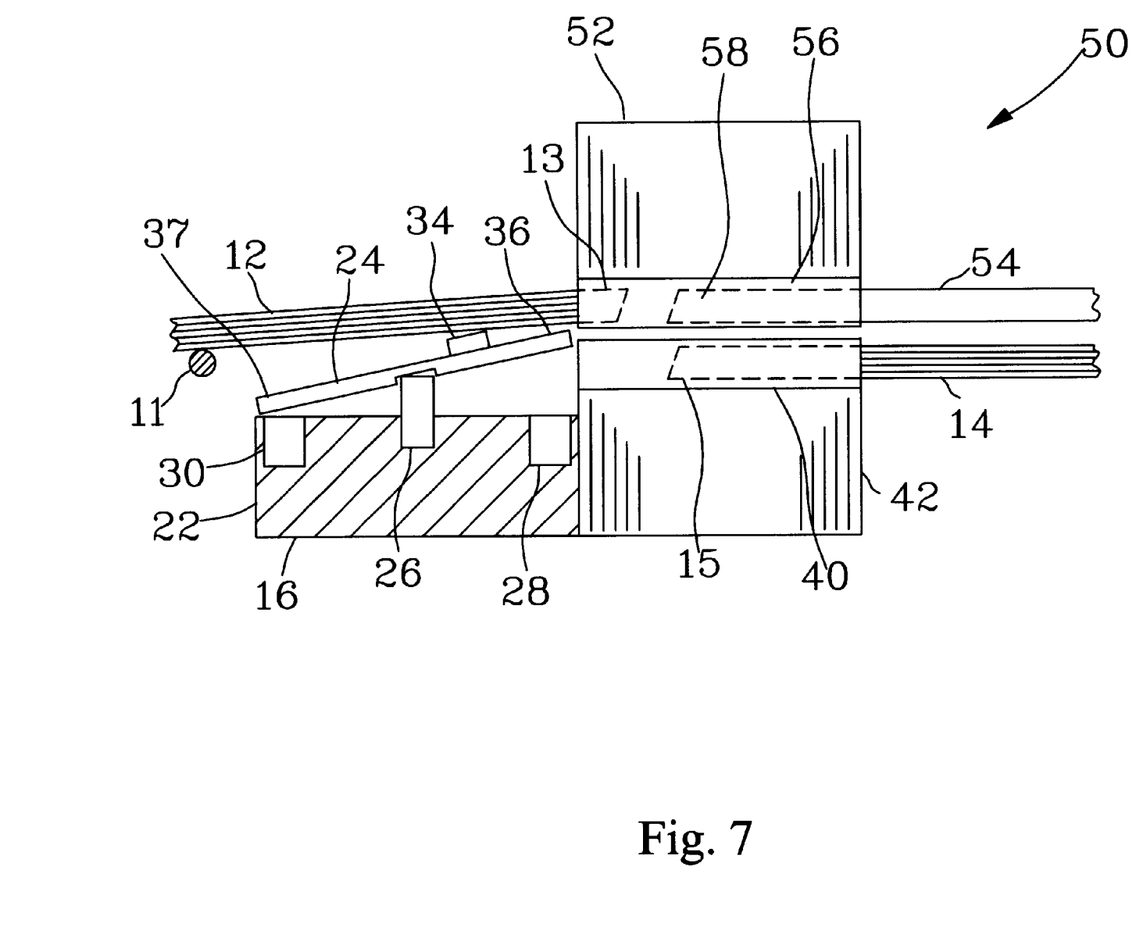
FIG. 7 is a side elevation view of the fiber optic switching apparatus of FIG. 5 to show the input fiber arranged to provide optical signals to a second output fiber.

FIG. 5 is a side elevation view of another embodiment according to the present invention to illustrate a 1×2 fiber optic switching apparatus, in which a fiber optic switching apparatus 50 includes the structure of FIGS. 1–4 in combination with a second fiber alignment head 52 and a second output fiber 54. The components of the fiber optic switching apparatus 10 that are included in the fiber optic switching apparatus 50 have the same reference numerals as in FIGS. 1–4. Referring to FIGS. 5–7, the second fiber alignment head 52 is formed to be essentially identical to the first fiber alignment head 42. The second output fiber 54 is secured within a second V-grooves 56. The first and second fiber alignment heads 42 and 52 are secured respectively to the housing (not shown in the figures) of the fiber optic switching apparatus 50 with a distance X between them and with the V-grooves 56 and 40 parallel and facing each other, as shown in FIG. 6.

The fiber optic switching apparatus 50 may be actuated to provide optical signals from the input fiber 12 to a selected one of the output fibers 14 and 54. Application of an electrical signal to the electromagnet 28 causes the switching member 24 to move to the down position shown in FIG. 5 to align the end 13 of the input fiber 12 with the end 15 of the output fiber 14. In a latching embodiment of the present invention, the electromagnet 28 has a residual magnetism sufficient to retain the end 36 of the switching member 24 in the down position in the absence of any control signal. Application of a control signal to the electromagnet 30 causes the switching member 24 to pivot about its support to place the switching member 24 in an up position shown in FIG. 7. When the switching member 24 is in the up position, the end 37 of the switching member 24 contacts the electromagnet 30. The residual magnetism of the electromagnet 30 latches the switching member 24 in the up position.

When the switching member 24 is in the up position, the fiber 12 is pushed upward by the protruded block 34 so that the end 13 of the input fiber 12 is aligned with the end 58 of the output fiber 54 in the V-groove 56 as shown in FIG. 7. The V-groove 56 is arranged such that when the switching member 24 is in the up position, the end 13 of the fiber 12 is pressed into the V-groove 56 in the manner described previously with reference to the end 13 of the fiber 12 and the V-groove 40. The input fiber 12 has a curved portion just outside the V-grooves 40 and 56 so that elastic forces in the fiber 12 retain the end 13 in contact with the sides of the V-groove 56 when the switching member 24 is in the up position. Therefore, application of control or switching signals to the relay 16 switches the optical output of the fiber optic switching apparatus 50 between the output fibers 14 and 54.

The description illustrated above is a 1×2 fiber optic switching apparatus 50. It is apparent for those who are skilled in the art that a 2×1 fiber optic switching apparatus of other embodiment according to the present invention has the structure essentially identical to the fiber optic switching apparatus 50, except for that the output fiber is corresponding to the fiber 12 and the input fibers are corresponding to the fibers 14 and 54.

Figure 8:
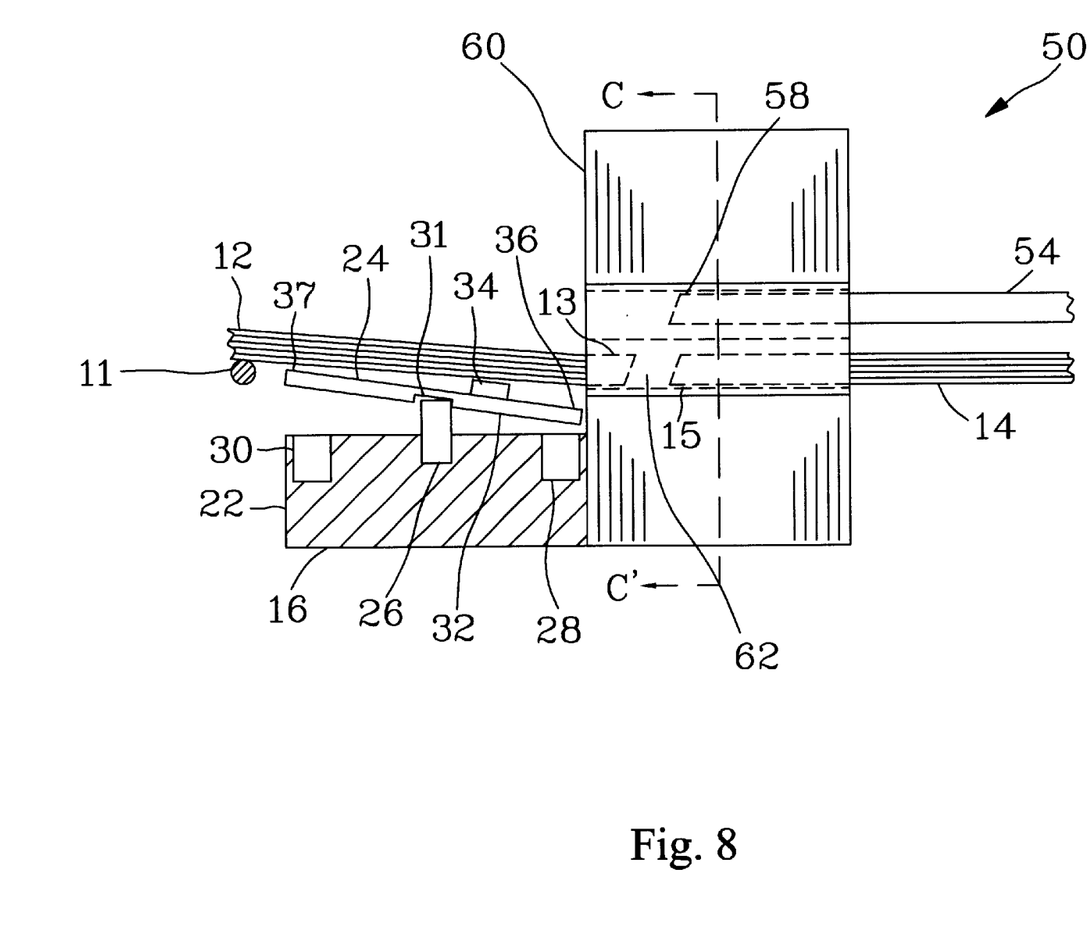
FIG. 8 is a side elevation view of a fiber optic switching apparatus with a different type of fiber alignment head.
Figure 9:
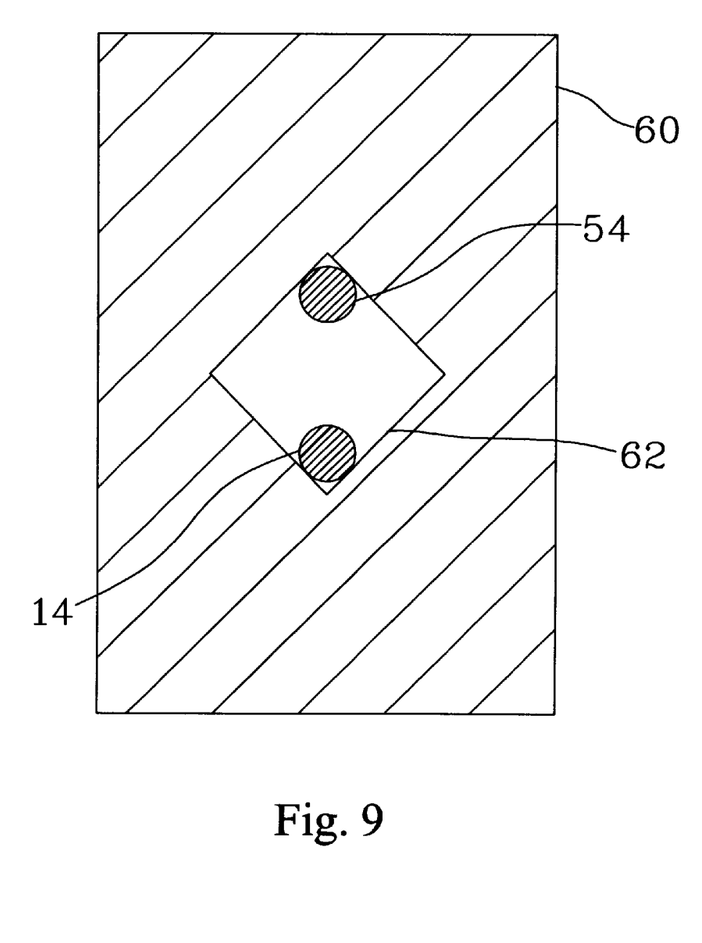
FIG. 9 is a cross sectional view of the fiber optic switching apparatus taken along line C–C' of FIG. 8.

FIG. 8 is a side elevation view of a further embodiment according to the present invention to illustrate a fiber optic switching apparatus 50 with a different type of fiber alignment head 60, and FIG. 9 is a cross sectional view of the fiber optic switching apparatus 50 taken along line C–C' of FIG. 8, in which the components and their reference numerals are the same as that in FIG. 5 except for the fiber alignment head 60 which is a block with a through hole 62 formed in its center. The through hole 62 is a diamond shape to form a top groove and a bottom groove therewithin respectively mounted with the fibers 54 and 14. The fiber 12 has its end 13 to extend into the through hole 62 so as to restrict the end 13 of the fiber 12 to move in the through hole 62 when the switching member 24 is moving between the up position and the down position.

Figure 10:
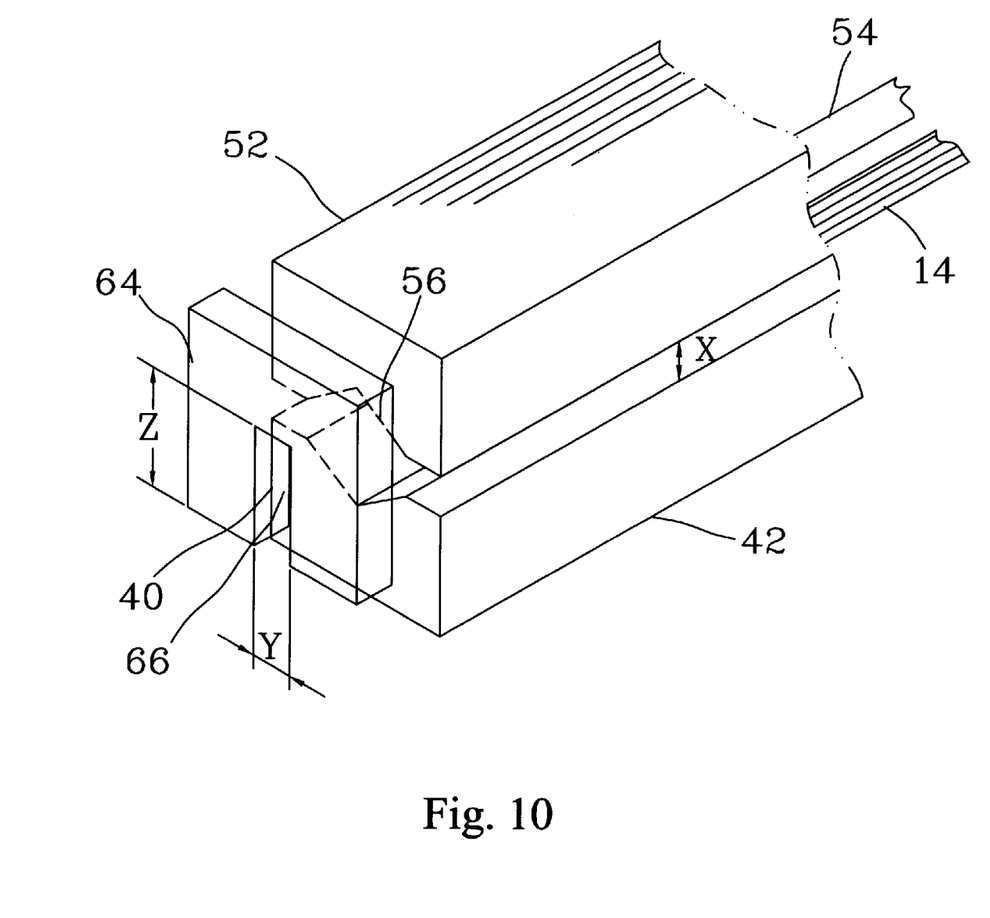
FIG. 10 is a perspective view of a fiber optic switching apparatus with a slot to guide an input fiber moved between two grooves.

In FIG. 10, the fiber alignment heads 42 and 52 with a distance X therebetween are the same as that of FIG. 5. However, a clamp 64 is mounted outside the V-grooves 40 and 56 with a slot 66 for the fiber 12 to extend through the slot 66. The slot 66 has a height Z slightly smaller than the distance between the bottoms of the grooves 40 and 56 and a width Y smaller than that of the V-grooves 40 and 56 and wider than the outer diameter of the fiber 12 (typically about 125 um). The width Y of the slot 66 is preferred to be slightly wider than the outer diameter of the fiber 12. As a result, the fiber 12 is restricted to move within the slot 66 and therefore the stability during the switching operation is further enhanced when the switching member 24 moves between the up position and down position, even the mechanic error of the switching member 24 is large.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A fiber optic switching apparatus, comprising:

a fiber alignment head having a groove formed therein;

a first optical fiber mounted in the groove with an end of the first optical fiber being arranged to be spaced apart from an end of the groove;

a switching member adjacent to the fiber alignment head pivotable between a first position and a second position;

a second optical fiber arranged with an end of the second optical fiber adjacent to the switching member; and means for supporting the second optical fiber connected with the second optical fiber, the means for supporting the second optical fiber being detached from the switching member, the second optical fiber, the switching member and the groove being arranged such that when the switching member is in the first position, the end of the second optical fiber is retained by elastic forces and therefore the ends of the first and second optical fibers are in longitudinal alignment in the groove, when the switching member is in the second position, the second optical fiber is pushed upward by the switching member and the ends of the first and second optical fibers are out of alignment.

2. The fiber optic switching apparatus of claim 1 wherein the ends of the first and second optical fibers are cleaved with an angle.

3. The fiber optic switching apparatus of claim 2 wherein the angle is ranged from 6 to 10 degrees.

4. The fiber optic switching apparatus of claim 3 wherein the angle is 8 degrees.

5. The fiber optic switching apparatus of claim 2 wherein the cleaved surfaces are polished.

6. The fiber optic switching apparatus of claim 5 further comprising an anti-reflection coating applied to at least one of the two cleaved surfaces.

7. A fiber optic switching apparatus, comprising:

a fiber alignment head having a through hole with a bottom groove and a top groove formed therein;

a first and a second optical fibers mounted respectively in the bottom and top grooves with the ends of the first and second optical fibers being arranged to be spaced apart from an end of the through hole;

a switching member adjacent to the fiber alignment head pivotable between a first position and a second position;

a third optical fiber arranged with an end of the third optical fiber adjacent to the switching member; and means for supporting the third optical fiber connected with the third optical fiber, the means for supporting the third optical fiber being detached from the switching member, the third optical fiber, the switching member and the through hole being arranged such that when the switching member is in the first position, the end of the third optical fiber is retained by elastic forces and therefore the ends of the first and third optical fibers are in longitudinal alignment in the bottom groove of the through hole, when the switching member is in the second position, the end of the third optical fiber is pushed upward by the switching member and retained by elastic forces and the ends of the second and third optical fibers are in longitudinal alignment in the top groove of the through hole.

8. The fiber optic switching apparatus of claim 7 wherein the ends of the first, second and third optical fibers are cleaved with an angle.

9. The fiber optic switching apparatus of claim 8 wherein the angle is ranged from 6 to 10 degrees.

10. The fiber optic switching apparatus of claim 9 wherein the angle is 8 degrees.

11. The fiber optic switching apparatus of claim 8 wherein the cleaved surfaces are polished.

12. The fiber optic switching apparatus of claim 11 further comprising an anti-reflection coating applied to at least one of the three cleaved surfaces.

13. A fiber optic switching apparatus, comprising:
   a first fiber alignment head having a first groove formed therein;
   a first optical fiber mounted in the first groove with an end of the first optical fiber being arranged to be spaced apart from an end of the first groove;
   a second fiber alignment head having a second groove formed therein being mounted to the first fiber alignment head with the first and second grooves in facing relationship;
   a second optical fiber mounted in the second groove with an end of the second optical fiber being arranged to be spaced apart from an end of the second groove;
   a switching member adjacent to the first fiber alignment head pivotable between a first position and a second position;
   a third optical fiber arranged with an end of the third optical fiber adjacent to the switching member; and
   means for supporting the third optical fiber connected with the third optical fiber, the means for supporting the third optical fiber being detached from the switching member, the third optical fiber, the switching member and the two grooves being arranged such that when the switching member is in the first position, the end of the third optical fiber is retained by elastic forces and therefore the ends of the first and third optical fibers are in longitudinal alignment in the first groove, when the switching member is in the second position, the end of the third optical fiber is pushed upward by the switching member and retained by elastic forces and the ends of the second and third optical fibers are in longitudinal alignment in the second groove.

14. The fiber optic switching apparatus of claim 13 wherein the ends of the first, second and third optical fibers are cleaved with an angle.

15. The fiber optic switching apparatus of claim 14 wherein the angle is ranged from 6 to 10 degrees.

16. The fiber optic switching apparatus of claim 15 wherein the angle is 8 degrees.

17. The fiber optic switching apparatus of claim 14 wherein the cleaved surfaces are polished.

18. The fiber optic switching apparatus of claim 17 further comprising an anti-reflection coating applied to at least one of the three cleaved surfaces.

19. The fiber optic switching apparatus of claim 13 wherein the first fiber alignment head is spaced apart from the second fiber alignment head with a distance.

20. The fiber optic switching apparatus of claim 13 further comprising a clamp outside the two grooves with a slot for guiding the end of the third optical fiber moved between the two grooves.

* * * * *